United States Patent
Briquet-Kerestedjian et al.

(10) Patent No.: US 10,172,289 B2
(45) Date of Patent: Jan. 8, 2019

(54) SYSTEM AND METHOD FOR THE AUTOMATIC ADJUSTMENT OF THE HEIGHT OF AN AGRICULTURAL IMPLEMENT USING 3D RECONSTRUCTION

(71) Applicant: COMMISSARIAT A L'ENERGIE ATOMIQUE ET AUX ENERGIES ALTERNATIVES, Paris (FR)

(72) Inventors: Nolwenn Briquet-Kerestedjian, Paris (FR); Frederic Colledani, Massy (FR); Baptiste Lelong, Les Martres de Veyre (FR); Patrick Sayd, Villebon sur Yvette (FR)

(73) Assignee: COMMISSARIAT A L'ENERGUE ATOMIQUE ET AUX ENERGIES ALTERNATIVES, Paris (FR)

( * ) Notice: Subject to any disclaimer, the term of this patent is extended or adjusted under 35 U.S.C. 154(b) by 21 days.

(21) Appl. No.: 15/531,617

(22) PCT Filed: Dec. 2, 2015

(86) PCT No.: PCT/EP2015/078386
§ 371 (c)(1),
(2) Date: May 30, 2017

(87) PCT Pub. No.: WO2016/087529
PCT Pub. Date: Jun. 9, 2016

(65) Prior Publication Data
US 2018/0279556 A1    Oct. 4, 2018

(30) Foreign Application Priority Data

Dec. 5, 2014 (FR) .................................. 14 62003

(51) Int. Cl.
*A01D 75/00* (2006.01)
*A01D 47/00* (2006.01)
(Continued)

(52) U.S. Cl.
CPC ............ *A01D 75/00* (2013.01); *A01B 63/008* (2013.01); *A01B 63/02* (2013.01); *A01D 47/00* (2013.01);
(Continued)

(58) Field of Classification Search
None
See application file for complete search history.

(56) References Cited

U.S. PATENT DOCUMENTS 4,197,691 A     4/1980   Woodruff
4,507,910 A     4/1985   Thornley et al.
(Continued)

FOREIGN PATENT DOCUMENTS

AU          53874 73 A      10/1974

OTHER PUBLICATIONS

International Search Report dated Feb. 19, 2016 in PCT/EP2015/078386 filed Dec. 2, 2015.
(Continued)

*Primary Examiner* — Richard M Camby
(74) *Attorney, Agent, or Firm* — Oblon, McClelland, Maier & Neustadt, L.L.P.

(57) ABSTRACT

The invention relates to a system for adjusting the height of an agricultural implement, including an arm that can be controlled to raise and lower the implement, a height measuring sensor, and a calculator configured to provide a control set point for the height of the arm on the basis of the measurements obtained by the height measuring sensor. The height measuring sensor is an imaging system including at least one camera mounted such that the sensor can form an image of a scene located in front of the agricultural implement in the direction of travel of the vehicle equipped with the arm. A computer processing unit is configured to produce, on the basis of the images delivered by the at least one
(Continued)

camera, a 3D reconstruction representative of the depth of the aforementioned scene.

13 Claims, 2 Drawing Sheets

(51) Int. Cl.
    *B60R 1/00*     (2006.01)
    *A01B 63/02*     (2006.01)
    *A01B 63/00*     (2006.01)
    *G06T 7/593*     (2017.01)
    *H04N 13/204*     (2018.01)

(52) U.S. Cl.
    CPC ................ *B60R 1/00* (2013.01); *G06T 7/593* (2017.01); *H04N 13/204* (2018.05); *B60R 2300/107* (2013.01); *B60R 2300/303* (2013.01); *G06T 2207/10012* (2013.01); *G06T 2207/30252* (2013.01)

(56) References Cited

U.S. PATENT DOCUMENTS

| | | |
|---|---|---|
| 8,381,502 B2 | 2/2013 | Dunn |
| 8,794,165 B2 * | 8/2014 | Martin .................... A01O 5/06 111/140 |
| 9,030,549 B2 * | 5/2015 | Redden ................ G06K 9/2036 348/89 |
| 2013/0345937 A1 | 12/2013 | Strelioff et al. |
| 2014/0236381 A1 | 8/2014 | Anderson et al. |

OTHER PUBLICATIONS

French Search Report dated Jul. 10, 2015 in FR 1462003 filed Dec. 5, 2014.

Loop, Charles et al., "Computing Rectifying Homographies for Stereo Vision", Proceedings of IEEE Conference on Computer Vision and Pattern Recognition, vol. 1, Apr. 1999, 14 pages.

\* cited by examiner

SYSTEM AND METHOD FOR THE AUTOMATIC ADJUSTMENT OF THE HEIGHT OF AN AGRICULTURAL IMPLEMENT USING 3D RECONSTRUCTION

TECHNICAL FIELD

The field of the invention is that of agricultural robotic systems. The invention aims more particularly a system making it possible to automatically adjust the position of an agricultural implement, such as an implement for cutting or tearing plants. In particular, it has application in the automating of the mechanical castration operations of production fields of corn seed.

PRIOR ART

Corn is a self-pollinating plant that is substantially subjected to the effect of heterosis, i.e. to the improvement of the capacities and of the vigour of the plant in hybrid or heterozygous form in relation to the plant in homozygous form. Breeders therefore seek to cross two homozygous producing lines in order to obtain a hybrid combination that is more productive and more vigorous and with interesting agronomic characteristics. The corn plant is monoic, comprised of one male inflorescence, called a panicle which is located at the top of the plant and is responsible for the emission of pollen, and of one female inflorescence located at mid-height of the plant, at the base of a leaf, with this female inflorescence being comprised of stigmas or receptive silks which are fertilised by the pollen, and lead to the formation of the ear.

The production of hybrid seed is carried out by cultivating in the same plot, generally on interspersed lines, plants of the two parent lines of the hybrid. The panicle of the productive female line is topped before flowering so that these plants are fertilised by the pollen of the male productive line. The ears harvested on this productive female line as such carry the hybrid seeds that are marketed. The production of hybrids is not limited to the obtaining of simple hybrids coming from the crossing of two lines of corn, and can consist in the crossing of a hybrid and of a line (three-channel hybrid) or in the crossing of two hybrids (double hybrid).

Topping the male panicle on the productive females before flowering is as such an essential step in the process of the production of hybrid corn seed. Indeed, the presence of pollen, even in small quantities, results in self-fertilisations on these productive females and a contamination in the production of hybrids. This topping was conventionally carried out manually. As the labour costs generated by this step are substantial, it was sought to mechanise this step with various implements, including blades intended to cut the canopy of the plants and rollers intended for the panicle or the cone.

The process of mechanical castration can be carried out either with one or several passes of blades only, or in two steps. In a first step, a pass with blades is carried out on the productive female rows: rotating blades cut the top of the male plant. The ideal cutting height is located at three-quarters of the cone, i.e. all of the leaves surrounding the panicle, from its canopy or at three-quarters of the panicle if the latter exceeds the cone. Between two and five days later, when the panicle has grown somewhat (2 to 5 cm) but before it is open enough to emit pollen, a tearing out with rollers or with tyres is carried out. The objective is to catch the panicle with the rollers or the tyres by tearing as least as possible the cone or the leaves that would still be around it. For this, the rollers have to be placed at the base of the panicle while still remaining above the leaves. The purpose of the first cut is to clear the row so that afterwards the panicle which grows faster than the rest of the plant extends beyond the foliage. The objective of the second cut is to tear the rest of the panicle and as such eliminate any risk of self-fertilising.

During these operations, the farmer visually evaluates the optimum cutting height of the panicle, from the nacelle of his machine and controls the height of the cutting or tearing implements. Generally, two rows are cut simultaneously at the same height which makes it possible to save time but risks penalising the cutting of one of the two rows if the plants are not of a homogeneous height. The quality of the cutting is therefore limited by the reactivity of the driver but also by the precision that the current architecture of the machine provides. Consequently, many panicles are not cut at the correct height. At the end of the two steps of mechanical cutting, only 70 to 80% of the panicles are entirely eliminated.

It is then necessary to supplement this step with a step of manual castrating the remaining panicles, and the remaining parts of the cut panicles when the cutting has not allowed for the complete elimination of the panicle, in order to respect the standards defined by GNIS (Groupement National Interprofessionnel des Semences et plants) pertaining to the rate of purity to be complied with for the production of corn seed. The tedious step is carried out by seasonal workers and represents a cost for the producer.

It is therefore sought to carry out these operations of mechanical castrating in an automated manner in order to improve the output of it, reduce the costs of it and to reduce the arduousness of it. In all of the mechanical castrating systems currently available, the eliminating of the panicle is inseparable from the eliminating of the leaves in particular the leaves of the cone. This eliminating of plant material penalises the plant in its future development and affects the final output of the crop. Improving mechanical castrating systems is therefore a genuine stake in agricultural machinery, with the goal being to optimise the tearing of the panicle while still minimising the elimination of vegetation Several approaches propose a solution for automatically adjusting the cutting height with a measurement sensor that is proper to each row.

The system proposed by the U.S. Pat. No. 4,197,691 uses a measurement sensor comprised of juxtaposed vertical rods mounted on a pivoting shaft that is more or less in contact with the leaves which triggers the sending of a signal to raise or lower. However, this sensor system via contact requires a permanent adjustment of the cutting height. In addition, two rows are always cut simultaneously at a common height.

Other approaches propose sensors for measuring distances seen from above, such as for the system proposed by patent U.S. Pat. No. 4,507,910 that studies the measurement and the control of heights during a harvest by a harvester. The sensor used is an ultrasound sensor located upstream of the threshing wheel. It is placed above harvests and measures the relative distance between the harvests and the sensor. Then a signal is sent in order to adjust the height of the threshing wheel with respect to the height desired for the harvest.

The model proposed by patent U.S. Pat. No. 8,381,502 is similar to the preceding system but is adapted for a corn castrating agricultural machine. Photocells placed upstream above the stalks of corn locate the top of the leaves of two rows at a time, then send a signal to raise or lower in order to cut the two rows at a common height. Due to the differences in heights, the roughness of the ground and the speed of the vehicle, the system constantly tries to adjust the set point in order to maintain a uniform cutting height.

Moreover a system proposed by SARL Duissard is known which is based on two sets of emitting/receiving photoelectric cells placed upstream of the cutting implements and located 13 cm one under the other, on either side of the two rows. These cells operate via direct detection: an infrared beam is emitted by the photoelectric cell while a reflector, located opposite, reflects the beam to the cell that receives it. If there is corn on the path of the beam, then the latter will not be received by the photoelectric cell. The maximum height is detected when the lower cell sees corn (beam obstructed by the corn therefore not perceived by the lower cell) and that the upper cell does not see any (beam perceived by the upper cell), with the precision that the distance between the two photocells is 13 cm. As such, when the two cells see corn (the two beams are obstructed) then the cutting height is too low and a cylinder is extended so that the arm carrying the cutting implements rises. On the contrary, when neither of the two cells sees corn (the two beams are received by the cells) then the cutting height is too high and the rod of the cylinder retracts so that the arm is lowered. The installation of a timer is required in order to retain the set point for several seconds as the time for detecting and for sending the set point are too short with respect to the time required for the displacement of the arm.

This system as such sends an "all or nothing" set point to the actuator (raise or lower) due to the presence of only two photocells. The system therefore constantly tries to adjust the cutting height with repeated and sometimes contrary set points which solicits it substantially.

Moreover as soon as the cells see a void, for example between two stalks of corn, the entire arm will be lowered and have to immediately be raised again at the level of the next stalk. Likewise, at the end of a row the entire system will be lowered and probably miss the first stalks of the following row.

The degree of precision is moreover limited by the vertical spacing between the two sets of photocells, which is 13 cm. The cells furthermore process the information for two rows simultaneously therefore the stalk of corn of the lower row will be cut too high. The cells furthermore process the information for two rows simultaneously therefore the stalk of corn of the lower row will be cut too high. Finally, the overall encumbrance of the system remains a problem for farmers.

DESCRIPTION OF THE INVENTION

The invention aims to improve the existing systems for automating the cutting or tearing operations of plants, and in order to do this proposes a system for adjusting the height of an agricultural implement, comprising an arm that can be controlled so as to raise and lower the agricultural implement, a height measuring sensor, and a calculator configured to provide a control set point for the height of the arm on the basis of the measurements obtained by the height measuring sensor, characterised in that the height measuring sensor is an imaging system comprising at least one camera mounted such that it can form an image of a scene located in front of the agricultural implement in a direction of travel of the vehicle equipped with the arm, and a computer processing unit configured to produce, on the basis of the images delivered by the at least one camera, a 3D reconstruction representative of the depth of the aforementioned scene.

Some preferred but not limiting aspects of this system are as follows:
- the imaging system is a stereoscopic imaging system comprising two cameras mounted in such a way as to form an image of the same scene on the basis of two distant points of view, and the computer processing unit is configured to produce the 3D reconstruction based on a pair of stereoscopic images delivered by the cameras;
- the at least one camera of the imaging system is a flight time camera, and the computer processing unit is configured to take a flight time measurement between the aforementioned scene and the camera.
- the 3D reconstruction provides information representative of the depth of the aforementioned scene in the form of a matrix in lines and columns, and the computer processing unit is furthermore configured to identify for each line or portion of a line of the 3D reconstruction the highest point;
- the computer processing unit is configured to identify one or several rows of plants in the 3D reconstruction;
- it further comprises a memory in which are recorded the measurements taken by the height measuring sensor, and the calculator is configured to provide the control set point for the height of the arm based on measurements previously recorded in the memory and corresponding to several 3D reconstructions of scenes of which at least one point is at a distance from the current position of the cutting implement less than a predetermined distance;
- It further comprises a measurement sensor of the forward speed in the direction of travel of the vehicle, and the calculator is configured to determine the distance travelled along the direction of travel between two 3D reconstructions produced successively by the computer processing unit;
- the calculator is configured to provide the control set point for the height of the arm using the average of said measurements previously recorded in the memory;
- the calculator is configured to provide the control set point for the height of the arm using the maxima of said measurements previously recorded in the memory;
- the calculator is configured to calculate a foliage density that indicates, for each height interval of a set of successive intervals, the percentage of measurements among said measurements previously recorded in the memory which indicate a height greater than the lower limit of the height interval, and to provide the control set point for the height of the arm on the basis of the lower limit of a height interval corresponding to a threshold percentage.

BRIEF DESCRIPTION OF THE DRAWINGS

Other aspects, purposes, advantages and characteristics of the invention shall appear better when reading the following detailed description of preferred embodiments of the latter, given by way of a non-limiting example, and given in reference to the annexed drawings wherein.

DETAILED DESCRIPTION OF PARTICULAR EMBODIMENTS

The invention relates to a system for adjusting the height of an agricultural implement. It applies in general to any field where a measurement and an adjustment of the height are required, in particular for implements for cutting or tearing plants such as those used for the castrating of corn or for the grain harvest.

Figure 1:
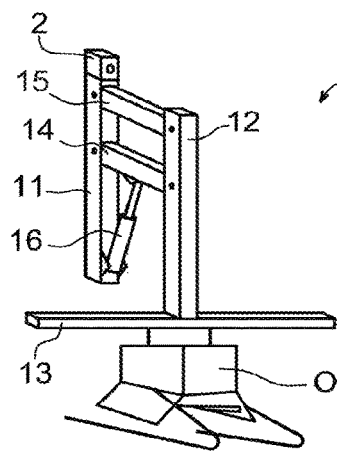
FIG. 1 is a perspective diagrammatical view of a system according to a possible embodiment of the invention.

In reference to FIG. 1, the invention relates to a system for adjusting the height of an agricultural implement O. This system is formed of an arm 1 that can be controlled so as to raise and lower the agricultural implement, of a height measuring sensor 2, and a calculator configured to provide a control set point for the height of the arm on the basis of the measurements obtained by the height measuring sensor.

The agricultural implement is typically a cutting implement (for example a cutting implement with blades) or tearing implement (for example with tyres or with rollers) of plants. Such an implement generally comprises a cutting or tearing instrument (blades, tyres or rollers), a motor for driving the instrument, a vegetation guide and a protective cover.

For the castrating of corn, the vehicle used is a high-clearance tractor which makes it possible to circulate between the rows of corn and to cut or tear several contiguous female productive rows at the same time. A conventional high-clearance tractor generally comprises two or four arms upstream of the vehicle, with each arm carrying two cutting or tearing implements so as to simultaneously cut two contiguous rows at the same height, which makes it possible to save time but can penalise the cutting of one or of both rows, with the two rows being cut at the same height. In a possible embodiment of the invention, only one cutting or tearing implement per arm will be used in order to individualise the cutting per row of crop.

Returning to FIG. 1, the arm 1 comprises a rear vertical post 11 that forms the main structural connection with the agricultural vehicle, and a front vertical post 12 that carries at its lower end a horizontal bar for the support of the agricultural implement 13 which extends perpendicularly to the direction of travel and whereon is mounted the agricultural implement O. In an alternative embodiment, the arm can carry several agricultural implements, two typically, for the carrying out of simultaneous operations on several rows of crop.

The vertical posts 11 and 12 are connected together by connecting posts 14 and 15 are mounted so as to pivot in relation to the rear vertical post 11. A cylinder 16 is mounted between the rear vertical post 11 and the connecting post 14, and provides a means for adjusting the height of the connecting post 14, and through this the height of the front vertical post 12 and of the cutting implement O, by pivoting of the connecting post 14 with respect to the rear vertical post 11.

The height measuring sensor 2 is an imaging system comprising at least one camera mounted so as to be able to form an image of a scene located in front of the agricultural implement in the direction of travel of the vehicle equipped with the arm. The imaging system further comprises a computer processing unit to produce, on the basis of the images delivered by the at least one camera, a 3D reconstruction representative of the depth of the aforementioned scene. The computer processing unit can be offset from the at least one camera.

In a possible embodiment, the imaging system is a flight time measuring system comprising a flight time camera and a computer processing unit configured to make a flight time measurement between the aforementioned scene and the camera and allow for the 3D reconstruction.

Such a measurement system delivers in real-time and at a rate of several tens Hz a 3D map of the environment observed. This is an active system that illuminates the scene using an infrared flash that is imperceptible for humans but is captured by the camera. The pulse of light sent is reflected by the surfaces present in the scene and is captured by the matrix of pixels of the camera. The computer processing unit calculates the return time of the pulse over each pixel, in general via a phase shift calculation. As such for each pixel, the distance is established between the camera and the point of the surface that reflected the pulse. Indeed, the return time corresponds to the time for a return trip of the light wave between the camera and the surface. This technology is very similar to the Lidar technologies (scanning laser) with the main advantage of having a 3D image of which the pixels are acquired simultaneously, which is advantageous in the framework of the invention where the measurement system is in motion.

The main limitation of this flight time measurement technology relates to the range, a few metres in a favourable environment, and is further limited in an outdoor environment (disturbances of the sensor by solar infrared radiation). But due to the short distance between the camera and the imaged surface as well as the orientation of the camera towards the ground (substantial limitation in the risks of a glare) make it possible to overcome this limitation.

In another possible embodiment, the imaging system is a stereoscopic system comprising two cameras mounted so as to be able to image, from two separate view points, the same scene located in front of the agricultural implement in the direction of travel of the vehicle equipped with the arm. The two cameras are carried by a stereoscopic head. The computer processing unit is then configured to produce the 3D reconstruction.

The cameras of the stereoscopic imaging system produce at the same instant two paired photographs, referred to as a stereoscopic pair, slightly offset spatially. The latter will make it possible to restore the depth of the canopy according to the following principle shown in FIG. 2 and which comprises the following steps:

calibrating the imaging system;
rectifying the images;
matching homologous points between two images (coming from the projection of the same point of the environment);
reconstructing the 3D point of the environment using the pairs of homologous points.

As the base line 3 between the two cameras is assumed to be fixed, the step of calibrating is done prior to the reconstruction campaign and remains valid as long as the mechanical stability of the stereo head is guaranteed. The following steps are carried out at every instant in order to produce a new 3D reconstruction of the environment in order to take a change into account either in the position of the vehicle or of the surface observed.

The step of calibration can be carried out by observing a known object (a pattern) under different angles and seen simultaneously by both cameras. The matching on each image pair of several characteristic points of the pattern make it possible to estimate the projection matrix of each camera (intrinsic parameters) as well as the geometric transformation connecting the two cameras (extrinsic parameters).

The parameters coming from the calibration make it possible to apply a rectification function that aligns the lines of the left camera with those of the right camera: a point P of the environment that is projected on the line i of camera 1 will be projected on the line i of camera 2. This operation makes it possible to accelerate and to render more robust the matching between the points of the two images that correspond to the same 3D point. The transformation chosen must ensure that the quality of the signal contained in the image is preserved (minimisation of smoothing and interpolation). An example of this type of algorithm is presented in the article by Loop and Chang, entitled "Computing rectifying homographies for stereo vision" Int. Conference CVPR, 1999.

Once the two images are rectified, a matching of the images I1 and I2 of the pair of stereoscopic images provided by the cameras is then carried out of which the purpose is to find the homologous points p1, p2 between the two images, i.e. the projections of the same points P of the aforementioned scene. It is as such identified that the point p1(u1, v1) in the left image I1 and the point p2(u2, v2) in the right image I2 are the projection of the same point P of the aforementioned scene. The coordinates X, Y, Z of this point P can then be calculated.

To do this, the first image I1 is scanned and for each pixel of this image, a search is made in the second image I2 acquired at the same time for the pixel that corresponds to the same physical point. Thanks to the rectification, this pixel is located on the same line of the second image I2 as the original pixel of the first image I1. This constraint reduces search time and the risks of error. To carry out a search, a vicinity of the original pixel is considered and the pixel having the vicinity that most resembles it is sought along the line. Various correlation scores have been proposed in literature, compromises between quality and rapidity. This search is iterated for all of the pixels of the line of the original image, then for all of the lines of this same image. Constraints of order between successive matchings as well as so-called "global" algorithms make it possible to consolidate the matchings made by eliminating aberrant results. For each matching, the distance between the columns of the two paired pixels can be saved: this is referred to as disparity, with this disparity being linearly linked to the depth of the corresponding 3D point.

During the last step, for each matching made between the two images and by using the knowledge of the calibration parameters of the system, it is possible to reconstruct via triangulation the corresponding 3D point. For all of the matchings carried out between the two images, a set of 3D points is reconstructed of which the coordinates are expressed in the locator of one of the cameras (or in an arbitrary locator rigidly linked to one of the cameras).

By orienting the at least one camera of the imaging system (stereoscopic or flight time measurement system) towards the rows of corn, the 3D points reconstructed correspond to points of the canopy. A surface can as such be reconstructed by using these reconstructed 3D points and as such model the canopy of the aforementioned scene. Once reconstructed, this surface can be analysed in order to determine the crest lines that connect the tops of the stalks belonging to the same row and the valleys corresponding to the inter-row space. In addition, in order to facilitate the searching for these zones of maximum curvature, as the reconstructed 3D surface is expressed in the locator of at least one camera and therefore able to be expressed in the locator of the vehicle, the crest lines and the valleys sought are in a direction parallel to the displacement of the vehicle.

According to the width of the field of view of at the least one camera, an image of several rows can be formed simultaneously. The imaging system can as such be adapted to make it possible to form images and simultaneously measure the height of several rows of crop.

The 3D reconstruction as such provides information that is representative of the depth of the aforementioned scene in matrix form in lines and columns where each point of the matrix provides information representative of the distance between the imaging system (more precisely the middle point between the cameras on the base line 3 in the case of a stereoscopic system) and the top of the plants present in the aforementioned scene.

The computer processing unit can be configured to identify the highest point for each line of the 3D reconstruction, or calculate for each line or portion of line of the 3D reconstruction the average of the points present on the line or portion of line, in such a way as to provide the height measurement information.

Figure 3:
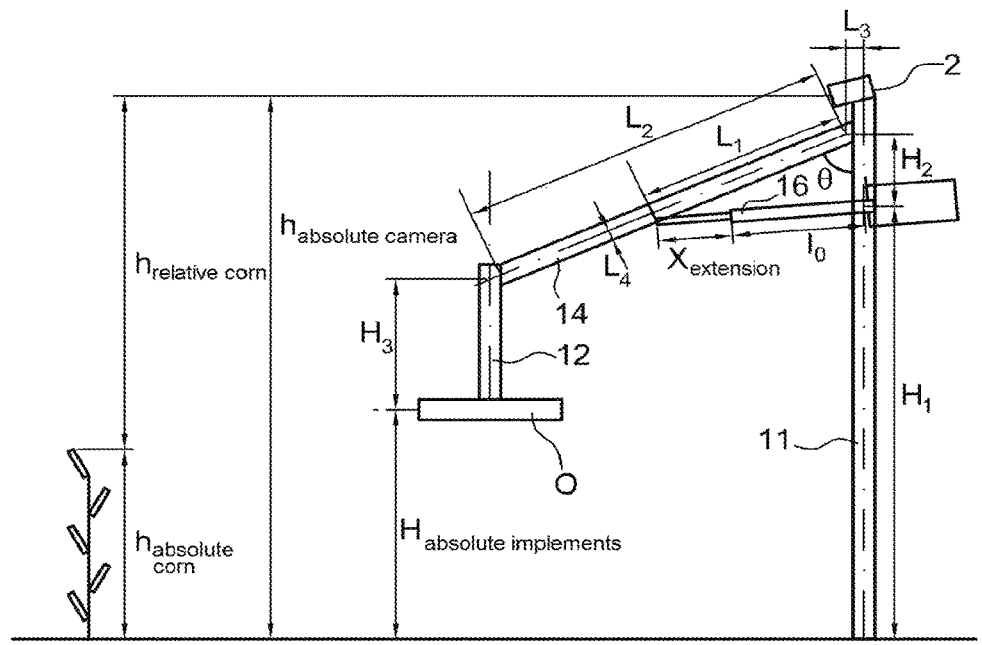
FIGS. 3 and 4 are diagrams of simplified models of the arm carrying the agricultural implement and the height measuring sensor.

In an embodiment of the invention, the at least one camera of the imaging system is mounted so as to be fixed with respect to the agricultural vehicle. As shown in FIGS. 1 and 3, it can in particular be mounted on the rear vertical post 11 of the arm 1 which is used as a main structural connection with the agricultural vehicle.

In this case, the position of the at least one camera of the imaging system 2 is known in the absolute locator of the vehicle and more particularly its absolute height $h_{absolute\ camera}$ which is constant. The reconstitution of the 3D surface of the canopy on the plants upstream of the agricultural implement O makes it possible to know the relative height $h_{relative\ corn}$ of the top of the plants with respect to the camera. As such the absolute height $h_{absolute\ corn}$ of the top of the plants is obtained with the relationship:

$$h_{absolute\ corn} = h_{absolute\ camera} - h_{relative\ corn},$$
with $h_{relative\ corn}$ positive. (1)

Figure 4:
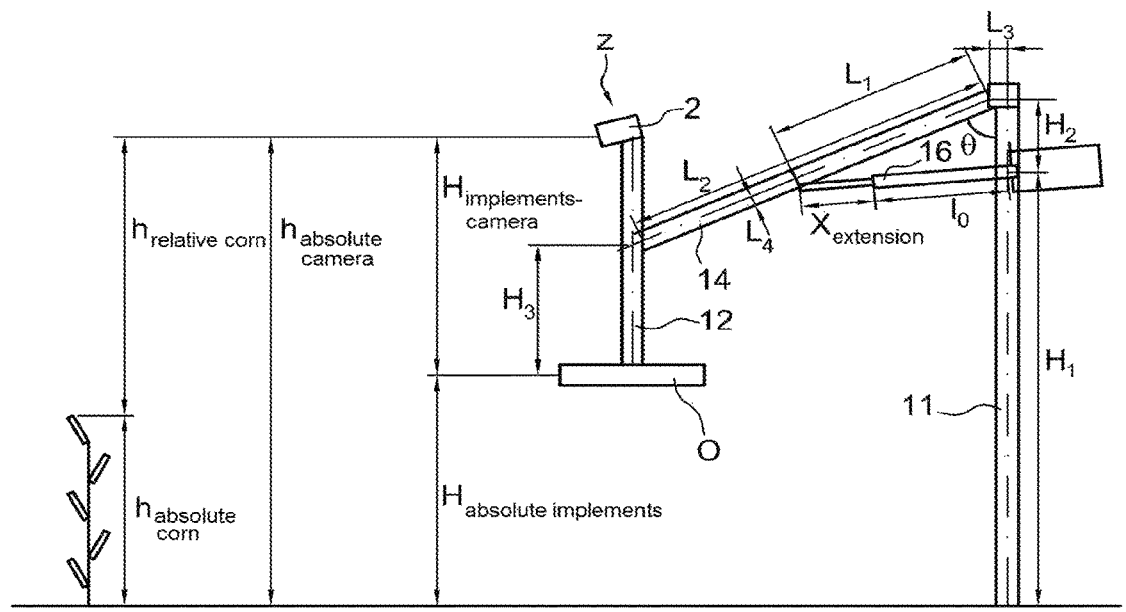

In another embodiment shown in FIG. 4, the at least one camera of the imaging system is mounted so as to be fixed with respect to the cutting implement O. As shown in FIG. 4, it can in particular be mounted on the top of the front vertical post 12 of the arm 1.

In this case, the absolute height $h_{absolute\ camera}$ of the camera varies. Thanks to the reconstruction of the 3D surface of the canopy, the relative height $h_{relative\ corn}$ of the top of the corn with respect to the camera is known. As such, the absolute height $h_{absolute\ corn}$ of the top of the plants can be deduced with the relationship:

$$h_{absolute\ corn} = h_{absolute\ camera} - h_{relative\ corn},$$
with $h_{relative\ corn}$ positive. (1)

In this case, it is here necessary to calculate the absolute height $h_{absolute\ camera}$ of the camera which is expressed by:

$$h_{absolute\ camera} = h_{absolute\ implements} + H_{implements-camera} \quad (2)$$

With $h_{absolute\ implements}$ calculated afterwards and $H_{implements-camera}$ the constant height between the implement or implements O and the camera.

Figure 2:
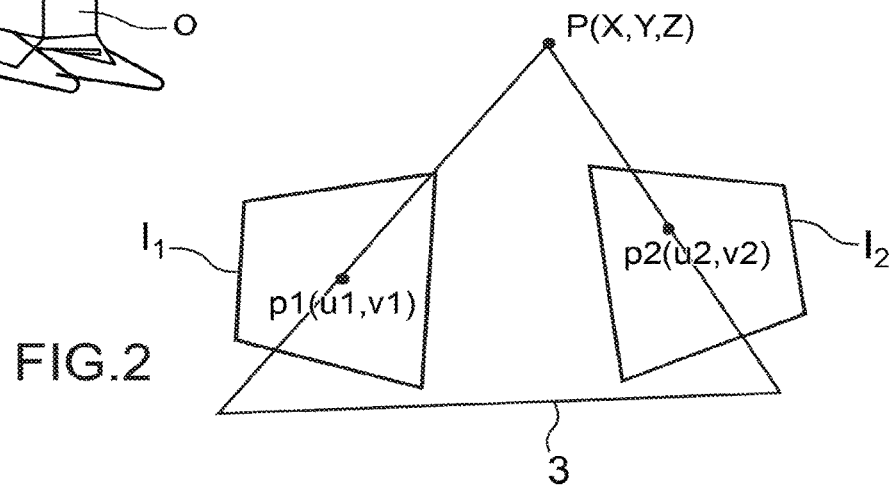
FIG. 2 is a diagram showing the geometric model of a stereoscopic imaging system.

A simplified model of the arm with the implement or implements O and the height measuring sensor upstream in the direction of travel is proposed in FIG. 2. The acquisitions are carried out for example every millisecond. On the other hand, the set point is calculated for example every 100 ms, using a certain number of acquisitions preceding the calculation. A variator coupled to a motor can be used to control in voltage the extension of the cylinder 16, here electric. The tension sent to the variator is connected to the motor angular position by the relationship:

$$\theta_{motor} = \frac{1}{U_{max\ variator}} \left(360 \frac{C_{cylinder}}{p}\right) U_{variator} \qquad (3)$$

With $U_{max\ variator}$ the maximum voltage that can be sent to the variator (10V for example), $C_{cylinder}$ the course of the electric cylinder (300 mm for example) and p the pitch of the screw of the motor (10 mm/rev for example). The invention extends however to other types of cylinders, in particular to hydraulic cylinders.

During an acquisition, the extension of the cylinder 16 is recovered thanks to an angular position sensor, for example a resolver, then in the case of FIG. 4, it is necessary to find the absolute height $h_{absolute\ implements}$ of the implement O by geometry in order to deduce therefrom the absolute height $h_{absolute\ corn}$ of the corn. During the calculation loop of the set point, the absolute heights of the corn can be processed according to different strategies, of which examples shall be presented hereinafter, in order to obtain the set point for the cutting height, i.e. the set point for the absolute height of the implements. The latter is then converted into a cylinder extension, then into voltage which is sent to the variator.

The objective is therefore to first know the relationship between the extension of the cylinder and the absolute height of the implements as well as that between the absolute height of the implements and the absolute height of the corn, in order to be able to apply the various strategies to the absolute heights of the corn. The position sensor of the motor makes it possible to know the number of increments $n_{increments}$ of the motor that controls the cylinder 16 which is to be converted into a motor position $\theta_{motor}$ then into a cylinder extension $x_{extension}$ thanks to the formulas:

$$\theta_{motor} = \frac{2\pi}{2^m} n_{increments} - \theta_{motor\ initial} \qquad (4)$$

$$x_{extension} = \frac{p}{2\pi} \theta_{motor} \qquad (5)$$

With m the increment unit (20 for the motor used), p the screw pitch (10 mm/rev for the cylinder used) and $\theta_{motor\ initial}$ the initial position of the motor.

In order to calculate $h_{absolute\ implements}$ according to $x_{extension}$, the angle $\theta$ is used between the rear vertical post 11 and the connecting post 14. By geometry, the following relationship is obtained:

$$(I_0 + x_{extension})^2 = \qquad (6)$$
$$L_1^2 + L_3^2 + L_4^2 + H_2^2 + 2\sin\theta(L_1 L_3 - L_4 H_2) - 2\cos\theta(L_1 H_2 + L_3 H_4)$$

Giving, $(I_0 + x_{extension})^2 = L_1^2 + L_3^2 + L_4^2 + H_2^2 + \qquad (7)$
$$2\sin(\theta - \alpha)\sqrt{(L_1 L_3 - L_4 H_2)^2 + (L_1 H_2 + L_3 L_4)}$$

With $$\alpha = a\tan\left(\frac{\sin\alpha}{\cos\alpha}\right) = a\tan\left(\frac{2(L_1 H_2 + L_3 L_4)}{2(L_1 L_3 - L_4 H_2)}\right)$$

Therefore: (8)

$$\theta = a\sin\left(\frac{(I_0 + x_{extension})^2 - L_1^2 - L_3^2 - L_4^2 - H_2^2}{2\sqrt{(L_1 L_3 - L_4 H_2)^2 + (L_1 H_2 + L_3 L_4)}}\right) + a\tan\left(\frac{L_1 H_2 + L_3 L_4}{L_1 L_3 - L_4 H_2}\right)$$

In addition, we have:

$$\cos\theta = \frac{H_1 + H_2 - H_3 - h_{absolute\ implements}}{L_2} \qquad (9)$$

Therefore the following relationship is obtained, required in the case of FIG. 4:

$$h_{absolute\ implements} = H_1 + H_2 - H_3 - L_2 \cos\theta \qquad (10)$$

On the other hand, once the set point for the height has been calculated using the various strategies, i.e. the height $h_{absolute\ implements}$ at which the implements must be at the moment when the plant to be cut is located at the level of the implements, it is necessary to know the set point which corresponds in terms of the extension of the cylinder $x_{extension}$. For this, thanks to the relationship (9) the angle $\theta$ required to obtain the desired height $h_{absolute\ implements}$ is calculated. Then the equation (6) makes it possible to deduce (11):

$$x_{extension} = \qquad (11)$$
$$\sqrt{L_1^2 + L_3^2 + L_4^2 + H_2^2 + 2\sin\theta(L_1 L_3 - L_4 H_2) - 2\cos\theta(L_1 H_2 + L_3 L_4)}$$
$$- I_0$$

Moreover, care can be taken to limit the set point of extension between 0 and the course of the cylinder (300 mm for the cylinder used) in order to not obtain set points that are negative or greater than the maximum extension of the cylinder.

Finally, the voltage $U_{variator}$ is calculated, between $U_{min\ variator}$ and $U_{max\ variator}$ (between 0 and 10V the variator used), to be sent to the variator thanks using the formula (12):

$$U_{variator} = \frac{U_{max\ variator} - U_{min\ variator}}{C_{cylinder}} x_{extension} + U_{min\ variator} \qquad (12)$$

Details are provided hereinafter on the elaboration by the calculator of the control set point for the height of the arm (determination of $h_{absolute\ implements}$ and through this of $U_{variator}$) on the basis of the measurements obtained by the height measuring sensor (measurement of $h_{relative\ corn}$).

The objective of cutting with blades is to clear the view on the row by cutting just enough leaves and panicles so that the latter can still grow again afterwards. The cut therefore has to be relative homogeneous, without creating too many irregularities. The ideal cutting height is located at three-quarters of the panicle. This supposes detecting the height of the base and of the top of the panicle in order to locate the three-quarters, which is difficult to reproduce with sensors, especially given that the panicle can be hidden within the cone. Moreover, imposing a cutting height at a certain number of centimetres below the top of the stalk is not suitable because the panicle can also be close to this top as well as much lower. It is therefore necessary to obtain a relative measurement, adapted to each stalk of corn and to different plant architectures (upright carriage, drooping leaves, etc.).

During the tearing, it is necessary to remove all of the panicles that have grown again. As the panicles grow faster than the leaves, the objective is that the height of the leaves remains relatively homogeneous so that the panicles extend beyond. For this, abrupt variation in height must be limited during the cutting so as to be able to follow these variations afterwards during the tearing. For the tearing, it is necessary to place the rollers or the tyres as close as possible to the canopy of the leaves in order to uproot the panicles that extend beyond without removing too many leaves.

Several strategies can therefore be considered according to their pertinence for the cutting or tearing. Each strategy can be based on the fact that the time elapsed between two 3D reconstructions produced by the height measuring imaging system is converted into distance travelled using the speed that is calculated at each instant. As the imaging system produces 3D reconstructions of scenes located upstream of the implement or implements, the set point to be sent to the actuator at an instant t is not calculated using the reconstruction produced at this same instant t but using prior reconstructions. As such, the reconstructions are memorised as they arrive then the set point is calculated using a small sample of reconstructions of the aforementioned scenes of which at least one point is at a distance from the current position of the cutting implement, in the direction of travel of the vehicle, less than a predetermined distance $d_{Ech}$.

The set point sent is as such calculated on the basis of prior reconstructions carried out while the imaging system formed an image of the canopy over a distance $d_{Ech}$ in the direction of travel of the vehicle upstream of the current position of the implement or implements.

As such, the system according to the invention can further comprise a memory in which the measurements taken by the height measuring sensor are recorded, and the calculator can be configured to provide the control set point for the height of the arm based on measurements previously recorded in the memory and corresponding to several 3D reconstructions of aforementioned scenes of which at least one point is at a distance from the current position of the cutting implement less than the predetermined distance $d_{Ech}$.

In the framework of this embodiment, it is important to precisely know the speed of displacement at each instant of the development of a 3D reconstruction in order to work not in elapsed time but in distance travelled. To do this, the system can include a measurement sensor of the forward speed in the direction of travel of the vehicle, and the calculator is then configured to determine the distance travelled along the direction of travel between two measurements taken successively by the height measuring sensor. In other terms, it is possible to timestamp the samples in memory with the instantaneous speed, in order then make it possible to determine, at the time the set point for the height is calculated, what the samples are corresponding to the 3D reconstructions carried out while the imaging system imaged the canopy over the distance $d_{Ech}$ in the direction of the path of the vehicle upstream of the current position of the implement or implements (more or less samples according to whether the displacement is fast or slow).

The measurement sensor of the forward speed can be comprised of an inductive proximity sensor associated with a plastic wheel fixed in the rim of a wheel of the vehicle and on the perimeter of which metal pins are arranged. At each pass in front of a metal pin, the output signal of the sensor is modified. As such, the forward speed can be deduced by calculating the time elapsed between two leading edges of the output signal, i.e. between two metal pins, knowing the length of the cord between these two points.

For each acquisition, the maximum absolute height of the corn $h_{absolute\ corn}$ is memorised. Then the set point for the height $h_{absolute\ implements}$ at which the implements have to cut the plant is calculated.

This calculation can be carried out in different ways according to the chosen strategy.

In an embodiment, the calculator is configured to provide the control set point for the height of the arm using the average of said measurements taken previously by the height measuring sensor over said predetermined distance $d_{Ech}$.

This embodiment corresponds to a so-called "average" strategy according to which for the acquisitions of $d_{Ech}$, the average height of the corn is calculated. The set point sent $h_{absolute\ implements}$ is then equal to this average height at which a height $h_{offset}$ can be subtracted which depends on the variety cut. This strategy has the advantage of encompassing the empty space between two stalks. It is intended to be used for cutting with blades.

In another embodiment, the calculator is configured to provide the control set point for the height of the arm using the maxima of the measurement taken previously by the height measuring sensor over said predetermined distance $d_{Ech}$.

This embodiment corresponds to a so-called "maximum" strategy according to which for the acquisitions of $d_{Ech}$, the maximum height is detected among the heights of corn on this sample. The set point sent $h_{absolute\ implements}$ is then equal to this maximum height at which a height $h_{offset}$ can be subtracted which depends on the variety cut. This strategy is rather intended for the tearing with rollers. It was effectively verified that panicles that measure about 10 mm in diameter cannot be detected by the light screen, only the leaves are detected by designing a relative straight profile following the cutting with blades. The objective here is therefore to place the rollers just at the top of this profile, knowing that everything that extends beyond can only be the panicle and will therefore be uprooted.

In yet another embodiment, the calculator is configured to calculate a foliage density that indicates, for each height interval of a set of successive intervals, the percentage of the measurements among said measurements taken previously by the height measuring sensor over said predetermined distance $d_{Ech}$ which indicate a height greater than the lower limit of the height interval, and to provide the control set point for the height of the arm on the basis of the lower limit of the interval of height corresponding to a threshold percentage.

Figure 5:
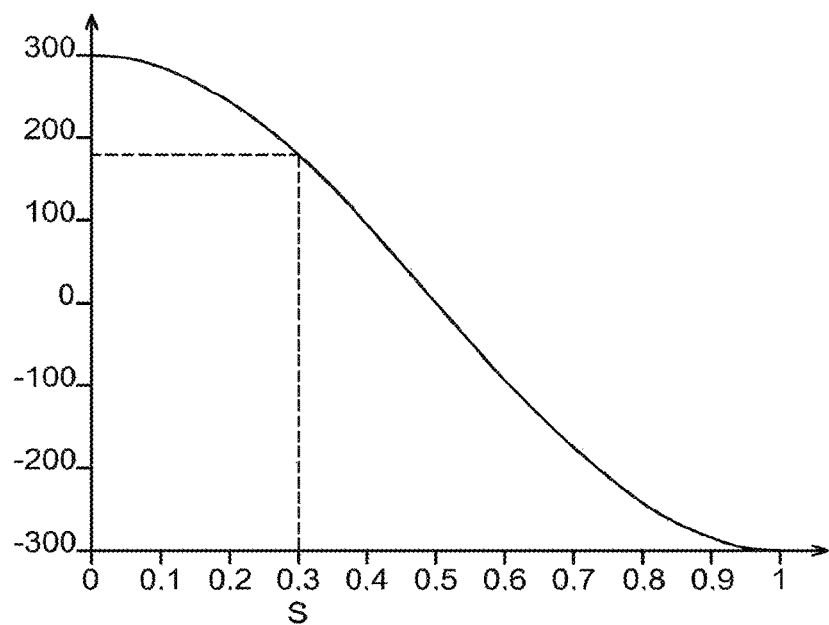
FIG. 5 is a diagram showing a foliage density that can be determined in a possible embodiment possible of the invention.

This embodiment corresponds to a so-called "foliage density" strategy according to which for the acquisitions of $d_{Ech}$, the minimum height among the heights of corn on this sample is identified. Then a loop is created that defines a current height equal to the minimum height incremented by 5 mm for example at each round of the loop and the percentage of acquisitions which correspond to a height greater than this new current height is calculated. As such, for the minimum height of the sample, 100% of the acquisitions of the sample have a height greater than the minimum height. Then as the current height increases, fewer and fewer acquisitions have a height greater than the current height. This percentage corresponds to what is called a foliage density. FIG. 5 shows an example of foliage density that can be determined in this embodiment. Plotted in ordinate is the height of the plants $h_{relative\ corn}$ and in abscissa the percentage of plants with a height greater than this height $h_{relative\ corn}$. A threshold S is defined starting from which it is deemed that the foliage density is sufficiently low (30% in the example of FIG. 5) in order to correspond to the optimum cutting height: indeed, the closer you approach the top of the plant, the more the foliage density is assumed to decrease. Note that reciprocally the foliage density can be estimated by starting at the maximum height and by checking the percentage of acquisitions that have a lower height.

The set point sent $h_{absolute\ implements}$ is then equal to the current height corresponding to this threshold S (around +175 mm in the example of FIG. 5), at which a height $h_{offset}$ can be subtracted which depends on the variety cut. This strategy is intended to be used for cutting with blades. It further approaches the ideal measurement for three-quarters of panicles: indeed, it is imagined that at this ideal height there is no more than a certain percentage of leaves. In addition, it takes the architecture of the plant into account: for a variety with drooping leaves, there will be more leaves around the panicle that for a variety with upright carriage.

The invention is not limited to the system such as described hereinabove but also extends to a vehicle, in particular a high-clearance tractor, equipped with one or several systems according to the invention. It also extends to a method for adjusting the height of an agricultural implement by means of a system comprising an arm that can be controlled so as to raise and lower the agricultural implement, comprising the steps of:

acquiring measurements from a height measuring sensor, the height measuring sensor being an imaging system comprising at least one camera mounted such that it can form an image of a same scene located in front of the agricultural implement in a direction of travel of a vehicle equipped with the arm, and a computer processing unit configured to produce, on the basis of the images delivered by the at least one camera, a 3D reconstruction representative of the depth of the aforementioned scene;

determining a control set point for the height of the arm on the basis of the measurements acquired.

The invention provides a gain in precision by determining a set point for the height that is qualified, precise and adapted to each stalk of corn thanks to the development of calculation algorithms suited to the stakes of the cutting and of the tearing.

In addition, the invention also provides a gain in productivity since the system can be reproduced on several arms in order to cut or tear several rows simultaneously, independently of one another.

Finally, this system makes it possible to reduce the arduousness of the work of the farmer who no longer has to constantly watch the corn heights and adjust the height of the implements.

As such, this system improves the profitability of the mechanical castrating operations and reduces the number of panicles remaining to be teared by hand.

The invention claimed is:

1. System for adjusting a height of an agricultural implement, comprising: an arm that can be controlled so as to raise and lower the implement; a height measuring sensor; and a calculator configured to provide a control set point for the height of the arm on the basis of measurements obtained by the height measuring sensor, wherein the height measuring sensor is an imaging system comprising at least one camera mounted such that it can form an image of a scene located in front of the agricultural implement in a direction of travel of a vehicle equipped with the arm, and a computer processing unit configured to produce, on the basis of the images delivered by the at least one camera, a 3D reconstruction representative of depth of the aforementioned scene.

2. System according to claim 1, wherein the imaging system is a stereoscopic imaging system comprising two cameras mounted in such a way as to form an image of the same scene from two distant points of view, and wherein the computer processing unit is configured to produce the 3D reconstruction based on a pair of stereoscopic images delivered by the cameras.

3. System according to claim 1, wherein the at least one camera of the imaging system is a flight time camera, with the computer processing unit being configured to make a flight time measurement between the aforementioned scene and the camera.

4. System according to claim 1, wherein the 3D reconstruction providing information representative of the depth of the aforementioned scene in the form of a matrix in lines and columns, the computer processing unit is further configured to identify for each line or portion of a line of the 3D reconstruction a highest point.

5. System according to claim 1, wherein the computer processing unit is configured to identify one or several rows of plants in the 3D reconstruction.

6. System according to claim 1, wherein the system further comprises a memory in which are recorded the measurements taken by the height measuring sensor, and the calculator is configured to provide the control set point for the height of the arm based on measurements previously recorded in the memory and corresponding to several 3D reconstructions of scenes of which at least one point is at a distance from a current position of the implement less than a predetermined distance.

7. System according to claim 6, further comprising a measurement sensor of the forward speed in the direction of travel of the vehicle, and wherein the calculator is further configured to determine the distance travelled along the direction of travel between two 3D reconstructions produced successively by the computer processing unit.

8. System according to claim 7, wherein the calculator is configured to provide the control set point for the height of the arm using an average of said measurements previously recorded in the memory.

9. System according to claim 7, wherein the calculator is configured to provide the control set point for the height of the arm using the maxima of said measurements previously recorded in the memory.

10. System according to claim 7, wherein the calculator is configured to calculate a foliage density that indicates, for each height interval of a set of successive intervals, a percentage of measurements among said measurements previously recorded in the memory which indicate a height greater than the lower limit of the height interval, and to provide the control set point for the height of the arm on the basis of the lower limit of a height interval corresponding to a threshold percentage.

11. System according to claim 1, wherein the agricultural implement is an implement for cutting or tearing plants, including corn.

12. Vehicle equipped with a system according to claim 1.

13. Method for adjusting a height of an agricultural implement by means of a system comprising an arm that can be controlled so as to raise and lower the agricultural implement, comprising the steps of:

acquiring measurements from a height measuring sensor, the height measuring sensor being an imaging system comprising at least one camera mounted such that it can form an image a scene located in front of the agricultural implement in a direction of travel of a vehicle equipped with the arm, and a computer processing unit configured to produce, on the basis of the images delivered by the at least one camera, a 3D reconstruction representative of the depth of the aforementioned scene;

determining a control set point for the height of the arm on the basis of the measurements acquired.

* * * * *

UNITED STATES PATENT AND TRADEMARK OFFICE
CERTIFICATE OF CORRECTION

PATENT NO. : 10,172,289 B2
APPLICATION NO. : 15/531617
DATED : January 8, 2019
INVENTOR(S) : Nolwenn Briquet-Kerestedjian et al.

Page 1 of 1

It is certified that error appears in the above-identified patent and that said Letters Patent is hereby corrected as shown below:

On the Title Page

Item (73), the Assignee's information is incorrect. Item (73) should read:
--(73) Assignee: COMMISSARIAT A L'ENERGIE ATOMIQUE ET AUX ENERGIES ALTERNATIVES, Paris (FR)--

Signed and Sealed this
Third Day of September, 2019

Andrei Iancu
*Director of the United States Patent and Trademark Office*